United States Patent [19]

Kato et al.

[11] Patent Number: 5,442,762

[45] Date of Patent: Aug. 15, 1995

[54] INSTRUCTING METHOD AND EXECUTION SYSTEM FOR INSTRUCTIONS INCLUDING PLURAL INSTRUCTION CODES

[75] Inventors: Takao Kato, Yokohama; Hideo Tamura, Sagamihara, both of Japan

[73] Assignee: Fujitsu Limited, Kawasaki, Japan

[21] Appl. No.: 202,668

[22] Filed: Feb. 25, 1994

Related U.S. Application Data

[63] Continuation of Ser. No. 606,957, Oct. 31, 1990, abandoned.

[30] Foreign Application Priority Data

Nov. 1, 1989 [JP] Japan .................................. 1-285471

[51] Int. Cl.⁶ ................................................ G06F 9/38
[52] U.S. Cl. .................................... 395/375; 364/230.6;
    364/254.1; 364/262.4; 364/262.81; 364/DIG. 1
[58] Field of Search ............... 395/375, 400, 425, 775,
                                                    395/800

[56] References Cited

U.S. PATENT DOCUMENTS

| | | | |
|---|---|---|---|
| 4,569,016 | 2/1986 | Hao et al. | 395/375 |
| 5,036,454 | 7/1991 | Rau et al. | 395/375 |
| 5,051,885 | 9/1991 | Yates, Jr. et al. | 395/375 |
| 5,115,500 | 5/1992 | Larsen | 395/425 |
| 5,117,488 | 5/1992 | Noguchi et al. | 395/375 |
| 5,179,680 | 1/1993 | Colwell et al. | 395/425 |
| 5,197,137 | 3/1993 | Kumar et al. | 395/375 |
| 5,202,967 | 4/1993 | Matsuzaki et al. | 395/375 |
| 5,293,592 | 3/1994 | Fu et al. | 395/375 |

FOREIGN PATENT DOCUMENTS

0363222A2  10/1989  European Pat. Off. .

OTHER PUBLICATIONS

Toshiyuki Nakata et al., A Computer with Low–Level Parallelism QA–2, pp. 280–281, Department of Information Science, Kyoto 606, Japan.
Conference Proceeding of the 13th Annual International Symposium on Computer Architecture, Jun. 2–5, 1986, pp. 280–289, Tokyo Japan.
Robert P. Calwell et al., A VLIW Architecture for a Trace Scheduling Compiler, Oct. 21, 1987, pp. 180–192, Washington, D.C.
G. B. Steven, et al., Harp: A Parallel Pipelined RISC Processor, Nov. 13, 1989, pp. 579–587, London, GB.

*Primary Examiner*—Alyssa H. Bowler
*Assistant Examiner*—Alpesh M. Shah
*Attorney, Agent, or Firm*—Staas & Halsey

[57] ABSTRACT

An instructing method for specifying an instruction which is to be executed in an information processing apparatus, forms each of instruction words from at least an instruction code and an operand specifying part for specifying a single instruction, forms each of long instruction words having a fixed length from a type code and one or plurality of the instruction words, where the type code specifies a structure of the one or plurality of the instruction words included in the long instruction word, and specifies one or plurality of instructions by a the long instruction word.

8 Claims, 7 Drawing Sheets

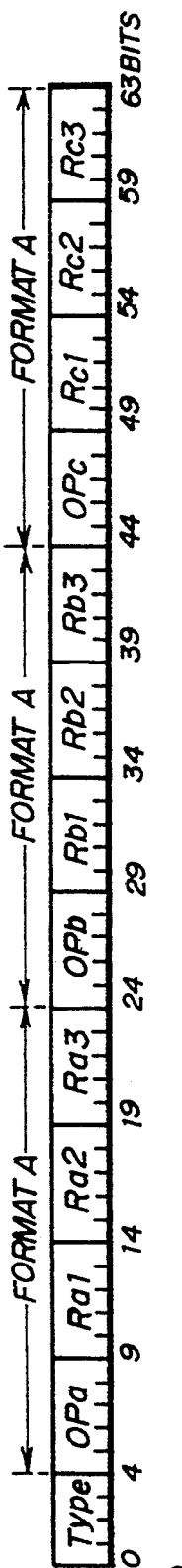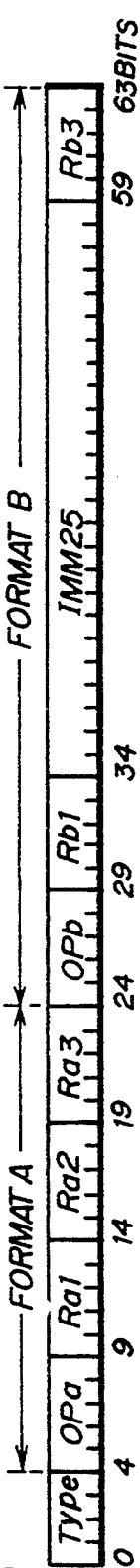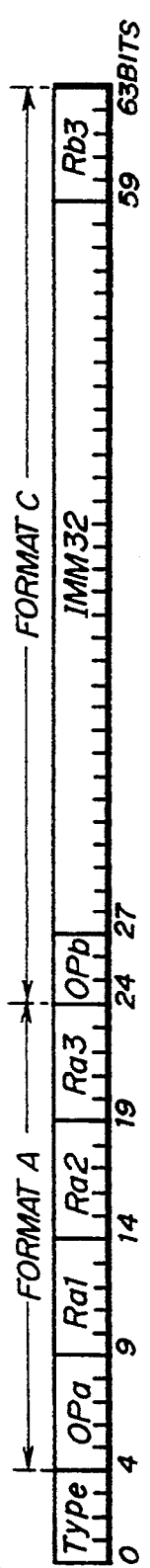
FIG.2A
FIG.2B
FIG.2C
FIG.2D

INSTRUCTING METHOD AND EXECUTION SYSTEM FOR INSTRUCTIONS INCLUDING PLURAL INSTRUCTION CODES

This application is a continuation of application Ser. No. 07/606,957, filed Oct. 31, 1990, now abandoned.

BACKGROUND OF THE INVENTION

The present invention generally relates to instructing methods and execution systems, and more particularly to an instructing method which specifies an instruction which is to be executed in an information processing apparatus and an execution system for executing an instruction in the information processing apparatus.

Recently, the performance of a processor improved considerably owing to improvements in the integration density of semiconductor devices and operation speeds of the semiconductor devices. However, there is a demand to further improve the performance of the processor. In order to meet this demand, an architecture called reduced instruction set computer (RISC) has been proposed. According to this RISC, an instruction word has a fixed length of 32 bits and the operation is carried out only between registers. In addition, a memory access is restricted only to a transfer between a memory and a register, and the RISC only has instructions with a high frequency of use of programs. By the restrictions described above, it is possible to simplify the hardware which is required to execute the instructions and also simplify the control of the hardware. Hence, the performance of the processor can be improved by increasing the operation clock frequency and reducing the number of cycles required to execute one instruction. On the other hand, there are proposals to simultaneously execute a plurality of instructions so as to further improve the performance of the processor.

FIGS. 1A, 1B and 1C show examples of instruction formats used in the conventional RISC architecture.

FIG. 1A shows an instruction having a first format. Based on an instruction code OP, this instruction instructs an operation between a register content specified by a second register instruction field R2X and a register content specified by a third register instruction field R3X and a storage of an operation result in a register specified by a first register instruction field R1X.

FIG. 1B shows an instruction having a second format. When this instruction is an operation instruction, this instruction instructs an operation between the register content specified by the second register instruction field R2X and 16-bit immediate data IMM16 and a storage of an operation result in the register specified by the first register instruction field R1X. On the other hand, when this instruction is a load instruction, this instruction instructs an addition of an address which is the register content specified by the second register instruction field R2X and a deviation or offset which is given as the immediate data IMM16 and a storage of the data of the address of the memory obtained by the addition in the register specified by the first register specifying field R1X.

FIG. 1C shows an instruction having a third format. This instruction instructs a storage of a 21-bit immediate data IMM21 in the register specified by the first register specifying field R1X.

According to the instruction having the first format, the twenty-first through thirty-first bits are unused and there is a problem in that the bit utilization efficiency is poor. On the other hand, according to the instruction having the second format, there is a problem in that a plurality of instructions must be used when large immediate data and deviation are required, such as the case where the immediate data exceeds 16 bits. Similarly, according to the instruction having the third format, there is a problem in that a plurality of instructions must be used when a large immediate data is required, such as the case where the immediate data exceeds 21 bits.

Furthermore, when executing a plurality of instructions in parallel, the control hardware becomes complex and the scale of the hardware structure required to execute the instructions in parallel becomes large because there exist a large number of combinations of instructions which must be executed in parallel.

SUMMARY OF THE INVENTION

Accordingly, it is a general object of the present invention to provide a novel and useful instructing method and execution system in which the problems described above are eliminated.

Another and more specific object of the present invention is to provide an instructing method for specifying an instruction which is to be executed in an information processing apparatus, comprising the steps of forming each of instruction words from at least an instruction code and an operand specifying part, for specifying a single instruction, forming each of long instruction words having a fixed length from a type code and one or a plurality of the instruction words, where the type code specifies a structure of the one or the plurality of the instruction words included in the long instruction word, and specifying one or the plurality of instructions by a the long instruction word. According to the instructing method of the present invention, it is possible to reduce the unused bits of the instruction words and improve the bit utilization efficiency. Furthermore, it is possible to specify even a large immediate data by a single long instruction word.

Still another object of the present invention is to provide an execution system for executing instructions in an information processing apparatus, comprising input means for inputting a long instruction word which has a fixed length, where the long instruction word to a type code and one or a plurality of instruction words, each of the instruction words include at least an instruction code and an operand specifying part for specifying a single instruction and the type code specifies a structure of the one or the plurality of the instruction words included in the long instruction word, judging means coupled to the input means for judging from the type code a combination and a number of the instruction words included in the long instruction word and for outputting a judgement result, a plurality of operation means coupled to the judging means for independently carrying out operations specified by the instruction words included in the long instruction word, and assigning means coupled to the judging means for assigning an operation specified by each instruction word included in the long instruction word to one of the operation means depending on the judgement result output from the judging means. According to the execution system of the present invention, it is possible to simplify both the control of hardware and the hardware structure.

A further object of the present invention is to provide a long instruction word for specifying one or a plurality of instructions which are to be executed in an information processing apparatus, and comprising, one or a plurality of instruction words, where each of the instruction words are made up of an instruction code and an operand specifying part for specifying a single instruction, and a type code specifying a structure of the one or the plurality of instruction words making up said long instruction word, where the long instruction word has a fixed length regardless of the structure of the one or the plurality of instruction words.

Other objects and further features of the present invention will be apparent from the following detailed description when read in conjunction with the accompanying drawings.

BRIEF DESCRIPTION OF THE DRAWINGS

FIGS. 2A, 2B, 2C and 2D respectively are diagrams showing embodiments of instruction formats used in the present invention;

DESCRIPTION OF THE PREFERRED EMBODIMENTS

Figure 1A:
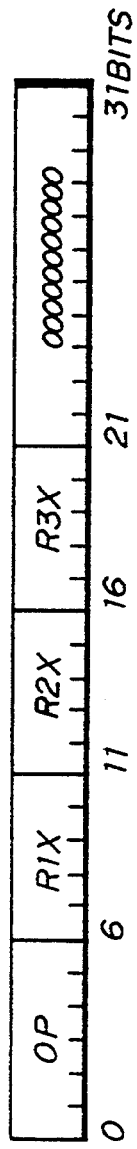
FIGS. 1A, 1B and 1C respectively are diagrams showing examples of instruction formats used in the conventional RISC architecture.
Figure 1B:
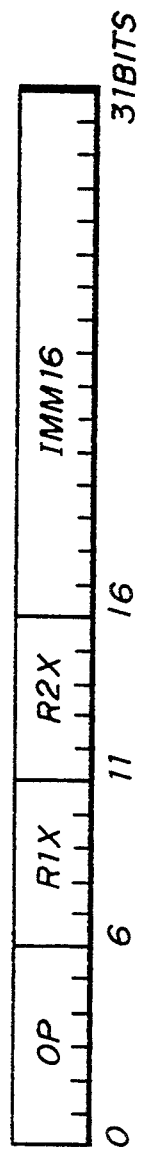
Figure 1C:

First, a description will be given of embodiments of instruction formats which may be used in the present invention, by referring to FIGS. 2A through 2D.

FIG. 2A shows a 64-bit long instruction word having a first instruction format. This long instruction word is made up of a type code Type arranged at bit numbers "0" through "3", and three instruction words having a format A and respectively arranged at bit numbers "4" through "23", "24" through "43", and "44" through "63".

The instruction word having the format A and arranged at the bit numbers "4" through "23" includes a 5-bit instruction code OPa, a 5-bit first register specifying field Ra1, a 5-bit second register specifying field Ra2 and a 5-bit third register specifying field Ra3. The register specifying fields Ra1, Ra2 and Ra3 are provided as an operand specifying part. This instruction word instructs an operation between a register content specified by the first register specifying field Ra1 and a register content specified by the second register specifying field Ra2 and a storage of an operation result in a register specified by the third register specifying field Ra3 depending on the instruction code OPa.

The instruction word having the format A and arranged at the bit numbers "24" through "43" includes a 5-bit instruction code OPb, a 5-bit first register specifying field Rb1, a 5-bit second register specifying field Rb2 and a 5-bit third register specifying field Rb3. The register specifying fields Rb1, Rb2 and Rb3 are provided as an operand specifying part. This instruction word instructs an operation between a register content specified by the first register specifying field Rb1 and a register content specified by the second register specifying field Rb2 and a storage of an operation result in a register specified by the third register specifying field Rb3 depending on the instruction code OPb.

Similarly, the instruction word having the format A and arranged at the bit numbers "44" through "63" includes a 5-bit instruction code OPc, a 5-bit first register specifying field Rc1, a 5-bit second register specifying field Rc2 and a 5-bit third register specifying field Rc3. The register specifying fields Rc1, Rc2 and Rc3 are provided as an operand specifying part. This instruction word instructs an operation between a register content specified by the first register specifying field Rc1 and a register content specified by the second register specifying field Rc2 and a storage of an operation result in a register specified by the third register specifying field Rc3 depending on the instruction code OPc.

The kind of operation to be carried out is specified by a combination of the 4-bit type code Type and one of the 5-bit instruction codes OPa, OPb and OPc. The kind of operation to be carried out is similarly specified for the long instruction words shown in FIGS. 2B through 2D which will be described hereunder.

FIG. 2B shows a 64-bit long instruction word having a second instruction format. This long instruction word is made up of a type code Type arranged at bit numbers "0" through "3", an instruction word having the format A and arranged at bit numbers "4" through "23", and an instruction word having a format B and arranged at bit numbers "24" through "63".

The instruction word having the format A and arranged at the bit numbers "4" through "23" includes the 5-bit instruction code OPa, the 5-bit first register specifying field Ra1, the 5-bit second register specifying field Ra2 and the 5-bit third register specifying field Ra3. The register specifying fields Ra1, Ra2 and Ra3 are provided as the operand specifying part. This instruction word instructs an operation between the register content specified by the first register specifying field Ra1 and the register content specified by the second register specifying field Ra2 and a storage of an operation result in the register specified by the third register specifying field Ra3 depending on the instruction code OPa.

The instruction word having the format B and arranged at the bit numbers "24" through "63" includes the 5-bit instruction code OPb, the 5-bit first register specifying field Rb1, a 25-bit immediate data IMM25 and the 5-bit third register specifying field Rb3. The first register specifying field Rb1 is arranged at the bit numbers "29" through "33", the immediate data IMM25 is arranged at the bit numbers "34" through "58", and the third register specifying field Rb3 is arranged at the bit numbers "59" through "63". When the instruction code OPb represents an operation instruction, this instruction word instructs an operation between the register content specified by the first register specifying field Rb1 and the immediate data IMM25 and a storage of an operation result in the register specified by the third register specifying field Rb3 depending on the instruction code OPb. On the other hand, when the instruction code OPb represents a load instruction, this instruction word instructs an addition of an address which is the register content specified by the first register specifying field Rb1 and a deviation which is given as the immediate data IMM25 and a storage of the data of the address of the memory obtained by the addition in the register specified by the third register specifying field Rb3 depending on the instruction code OPb.

FIG. 2C shows a 64-bit long instruction word having a third instruction format. This long instruction word is made up of a type code Type arranged at bit numbers "0" through "3", an instruction word having the format A and arranged at bit numbers "4" through "23", and an instruction word having a format C and arranged at bit numbers "24" through "63".

The instruction word having the format A and arranged at the bit numbers "4" through "23" includes the 5-bit instruction code OPa, the 5-bit first register specifying field Ra1, the 5-bit second register specifying field Ra2 and the 5-bit third register specifying field Ra3. The register specifying fields Ra1, Ra2 and Ra3 are provided as the operand specifying part. This instruction word instructs an operation between the register content specified by the first register specifying field Ra1 and the register content specified by the second register specifying field Ra2 and a storage of an operation result in the register specified by the third register specifying field Ra3 depending on the instruction code OPa.

The instruction word having the format C and arranged at the bit numbers "24" through "63" includes the 3-bit instruction code OPb, a 32-bit immediate data IMM32 and the 5-bit third register specifying field Rb3. The immediate data IMM32 is arranged at the bit numbers "27" through "58", and the third register specifying field Rb3 is arranged at the bit numbers "59" through "63". This instruction word instructs a storage of immediate data IMM32 in the register specified by the third register specifying field Rb3 depending on the instruction code OPb.

FIG. 2D shows a 64-bit long instruction word having a fourth instruction format. This long instruction word is made up of a type code Type arranged at bit numbers "0" through "3", and a 60-bit instruction word having the format D and arranged at bit numbers "4" through "63".

The instruction word having the format D and arranged at the bit numbers "4" through "63" includes the 5-bit instruction code OPa, the 32-bit immediate data IMM32 and the 5-bit third register specifying field Rb3. The immediate data IMM32 is arranged at the bit numbers "9" through "40", and the third register specifying field Ra3 is arranged at the bit numbers "59" through "63". This instruction word instructs a storage of immediate data IMM32 in the register specified by the third register specifying field Ra3 depending on the instruction code OPa.

In the long instruction words shown in FIGS. 2A through 2D, the formats A through D of the instruction words are distinguished from the value of the type code Type.

Next, a description will be given of an information processing apparatus which is applied with an embodiment of the instructing method according to the present invention and an embodiment of the execution system according to the present invention, by referring to FIG. 3.

Figure 3:
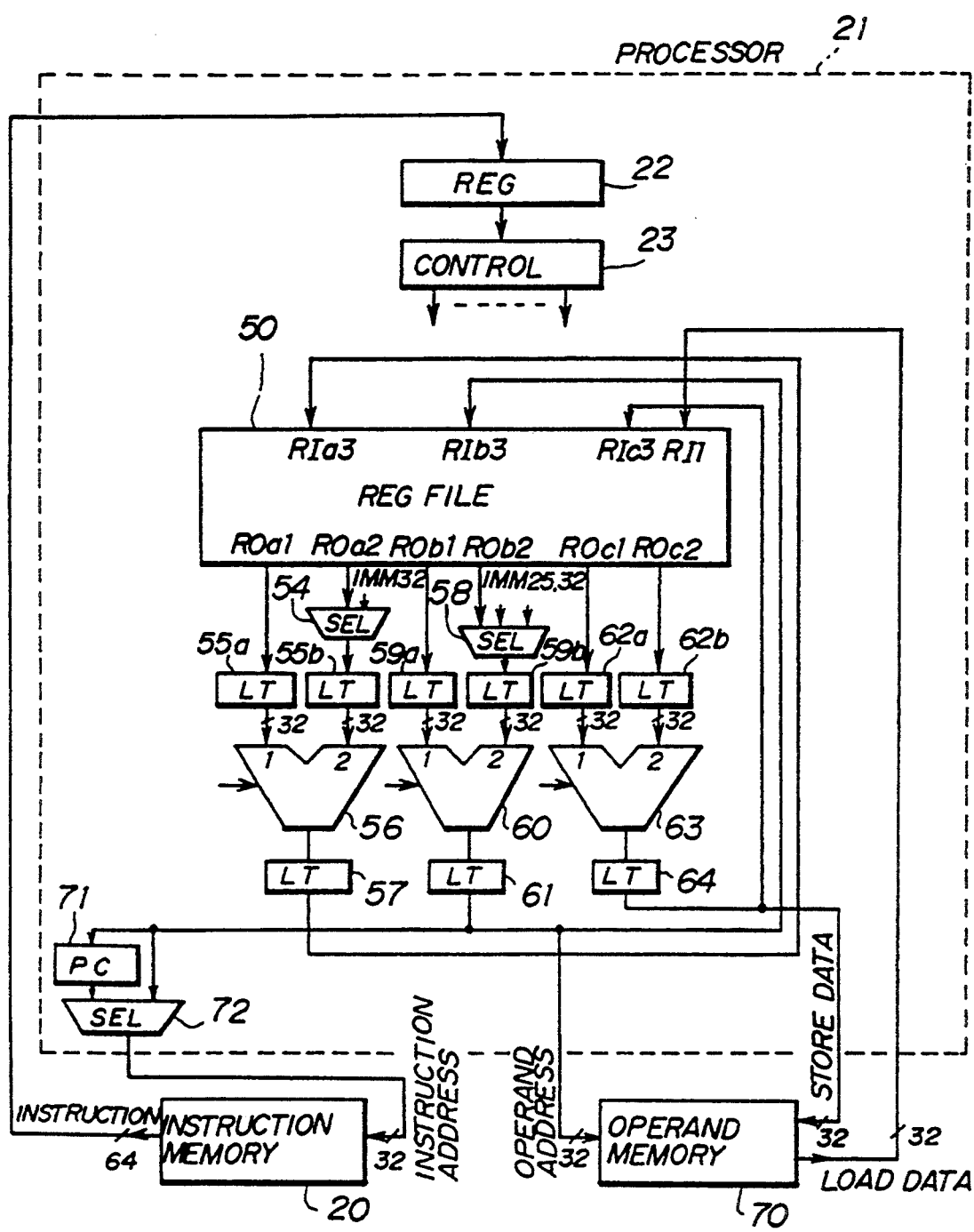
FIG. 3 is a system block diagram showing an essential part of an information processing apparatus which is applied to the present invention.

FIG. 3 shows an essential part of the information processing apparatus. The information processing apparatus includes an instruction memory 20, a processor 21 and an operand memory 70. A 64-bit long instruction word which is read from the instruction memory 20 is stored in an instruction memory 22 within the processor 21. Each bit of the long instruction word stored in the instruction memory 22 is supplied to a control circuit 23 within the processor 21.

Figure 4:
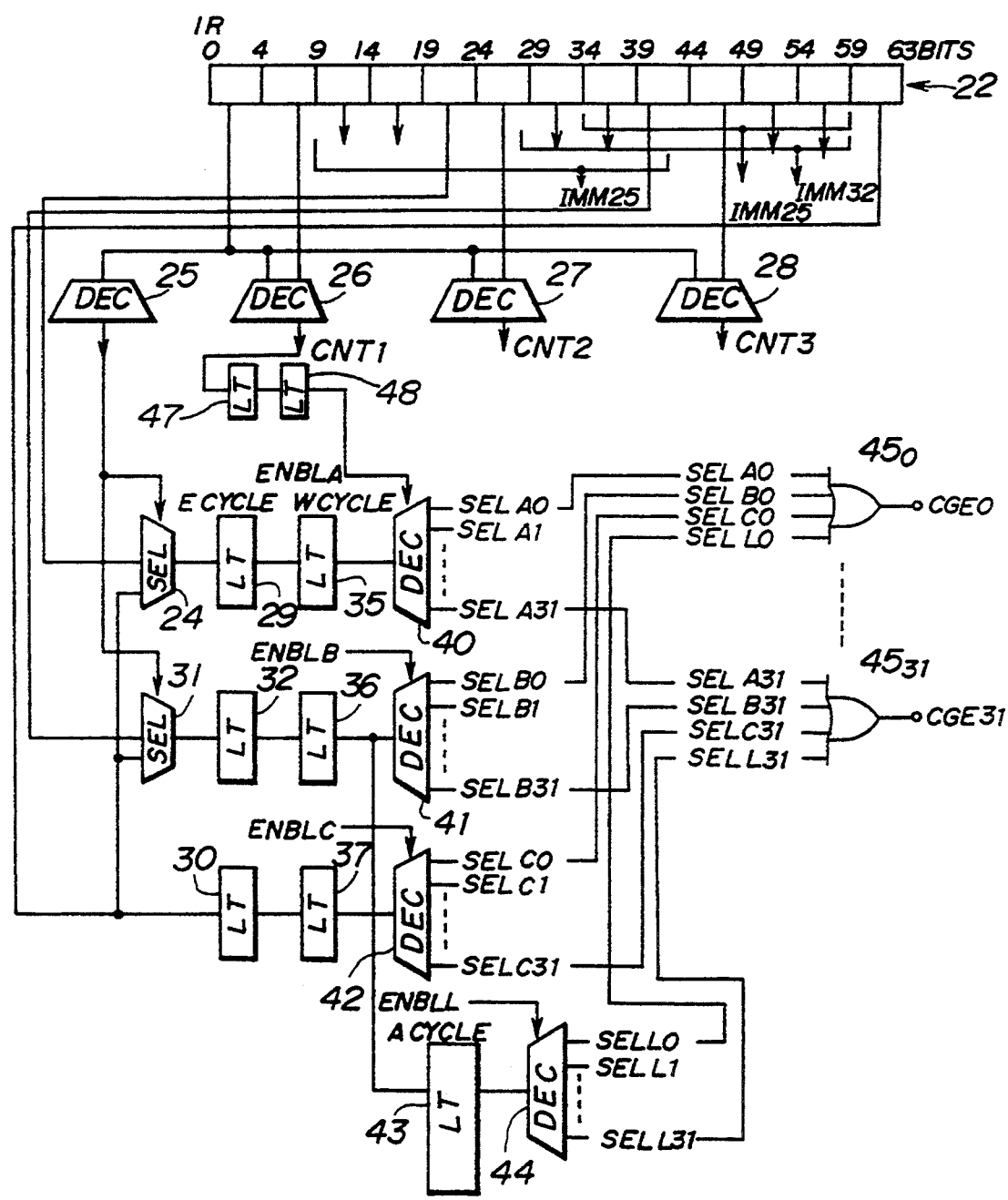
FIG. 4 is a system block diagram showing an embodiment of a control circuit shown in FIG. 3 together with an instruction register.

FIG. 4 shows an embodiment of the control circuit 23 together with the instruction register 22. A decoder 25 decodes the bit numbers "0" through "3" of the instruction word stored in the instruction register 22, that is, the type code Type. A decoder 26 decodes the bit numbers "4" through "8" of the instruction word together with the type code Type and generates a first operation circuit control signal CNT1. A decoder 27 decodes the bit numbers "24" through "28" of the instruction word together with the type code Type and generates a second operation circuit control signal CNT2. Similarly, a decoder 28 decodes the bit numbers "44" through "48" of the instruction word together with the type code Type and generates a third operation circuit control signal CNT3. The bit numbers decoded in the decoders 26, 27 and 28 excluding the type code Type respectively correspond to the instruction codes OPa, OPb and OPc of the long instruction word having the first instruction format.

A selector 24 selects the bit numbers "19" through "23" or the bit numbers "59" through "63" of the instruction word which is stored in the instruction register 22 in response to an output signal of the decoder 25. The bits selected by the selector 24 are latched in a latch circuit 29 during an execute cycle. The bit numbers "59" through "63" of the instruction word which is stored in the instruction register 22 are latched in a latch circuit 30 during the execute cycle. A selector 31 selects the bit numbers "59" through "63" or the bit numbers "39" through "43" of the instruction word which is stored in the instruction register 22 in response to the output signal of the decoder 25. The bits selected by the selector 31 are latched in a latch circuit 32 during the execute cycle.

Outputs of the latch circuits 29, 32 and 30 are respectively latched in latch circuits 35, 36 and 37 during a write cycle, and outputs of the latch circuits 35, 36 and 37 are respectively decoded in decoders 40, 41 and 42. In addition, the output of the latch circuit 36 is latched in a latch circuit 43 during an access cycle, and an output of the latch circuit 43 is decoded in a decoder 44. The decoders 40, 41, 42 and 44 are controlled by portions of the control signals CNT1, CNT2 and CNT3 which are output from the decoders 26, 27 and 28. Particularly, the decoder 40 is enabled in response to an enable signal ENBLA which is obtained by passing the control signal CNT1 through two latch circuits 47 and 48. Similarly, the decoder 41 is enabled in response to an enable signal ENBLB which is obtained by passing the control signal CNT2 through two latch circuits (not shown), and the decoder 42 is enabled in response to an enable signal ENBLC which is obtained by passing the control signal CNT3 through two latch circuits (not shown). The decoder 44 is enabled in response to an enable signal ENBLL which is obtained by passing the control signal CNT2 through one latch circuit (not shown). The illustration of the latch circuits which are used to obtain the enable signals ENBLB, ENBLC and ENBLL is omitted in FIG. 4 in order to simplify the interconnections.

Thirty-two OR circuits $45_0$ through $45_{31}$ respectively generate clock gate enable signals CGE0 through CGE31 based on the outputs of the decoders 40, 41, 42 and 44.

Figure 5:
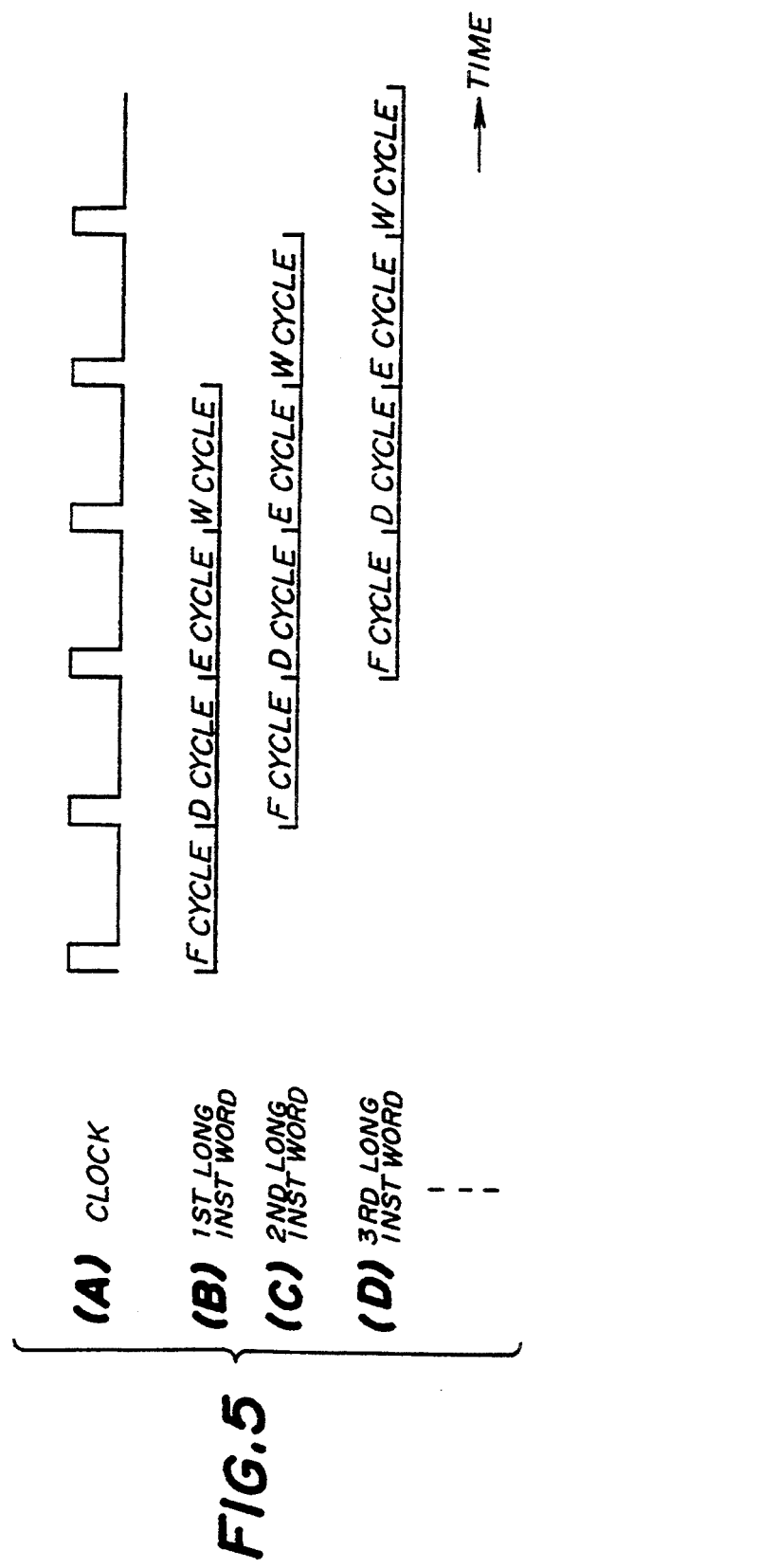
FIG. 5 is a timing chart for explaining a pipeline operation of a processor shown in FIG. 3.

The processor 21 shown in FIG. 3 carries out a pipeline operation. In this case, a fetch (F) cycle, a decode (D) cycle, an execute (E) cycle and a write (W) cycle of the first long instruction word are carried out as shown in FIG. 5(B) in synchronism with a clock signal shown in FIG. 5(A). The F, D, E and W cycles of the second and third long instruction words are respectively carried out similarly as shown in FIG. 5(C) and (D). In other words, the cycles of two successive long instruction words are shifted by one cycle.

However, in the case of the load instruction within the long instruction word, an address calculation is carried out in place of the E cycle and a memory access (access (A) cycle) is made in place of the W cycle.

The clock signal shown in FIG. 5(A) is supplied to the latch circuits and the like of the processor 21 shown in FIG. 3.

When the long instruction word of the first format is stored in the instruction register 22, the decoder 25 decodes the type code Type, and the decoders 26, 27 and 28 respectively decode the instructions codes OPa, OPb and OPc together with the type code Type. In addition, the third register specifying fields Ra3, Rb3 and Rc3 are respectively latched in the latch circuits 29, 32 and 30 during the E cycle. The third register specifying fields Ra3, Rb3 and Rc3 are respectively latched in the latch circuits 35, 36 and 37 during the W cycle and decoded in the respective decoders 40, 41 and 42.

When the long instruction word of the second format is stored in the instruction register 22, the decoder 25 decodes the type code Type, and the decoders 26 and 27 respectively decode the instruction codes OPa and OPb together with the type code Type. In addition, the selector 31 selects the bit numbers "59" through "63" of the instruction word which is stored in the instruction register 22 in response to the output signal of the decoder 25, and the third register specifying fields Ra3 and Rb3 are respectively latched in the latch circuits 29 and 32 during the E cycle. Furthermore, the bits which are latched in the latch circuits 29 and 32 are respectively latched in the latch circuits 35 and 36 during the W cycle and decoded in the respective decoders 40 and 41. The decoder 42 is disabled in response to the enable signal ENBLC. Moreover, the third register specifying field Rb3 which is output from the latch circuit 36 is latched in the latch circuit 43 during the A cycle and is decoded by the decoder 44. This decoder 44 is enabled in response to the enable signal ENBLL only when the instruction word having the format B is a load instruction.

When the long instruction word having the third format is stored in the instruction register 22, the decoder 25 decodes the type code Type, and the decoders 26 and 27 respectively decode the instruction codes OPa and OPb together with the type code Type. In addition, the selector 31 selects the bit numbers "59" through "63" of the instruction word which is stored in the instruction register 22 in response to the output signal of the decoder 25, and the third register specifying fields Ra3 and Rb3 are respectively latched in the latch circuits 29 and 32 during the E cycle. Furthermore, the bits which are latched in the latch circuits 29 and 32 are respectively latched in the latch circuits 35 and 36 during the W cycle and decoded in the respective decoders 40 and 41. The decoder 42 is disabled in response to the enable signal ENBLC. Moreover, the third register specifying field Rb3 which is output from the latch circuit 36 is latched in the latch circuit 43 during the A cycle and is decoded by the decoder 44. This decoder 44 is enabled in response to the enable signal ENBLL only when the instruction word having the format C is a load instruction.

When the long instruction word having the fourth format is stored in the instruction register 22, the decoder 25 decodes the type code Type, and the decoder 26 decodes the instruction code OPa together with the type code Type. In addition, the selector 24 selects the bit numbers "59" through "63" of the instruction word which is stored in the instruction register 22 in response to the output signal of the decoder 25, and the third register specifying field Ra3 is latched in the latch circuit 29 during the E cycle. Furthermore, the bits which are latched in the latch circuit 29 are latched in the latch circuit 35 during the W cycle and decoded by the decoder 40. The decoders 41, 42 and 44 are disabled by the respective enable signals ENBLB, ENBLC and ENBLL.

Figure 6:
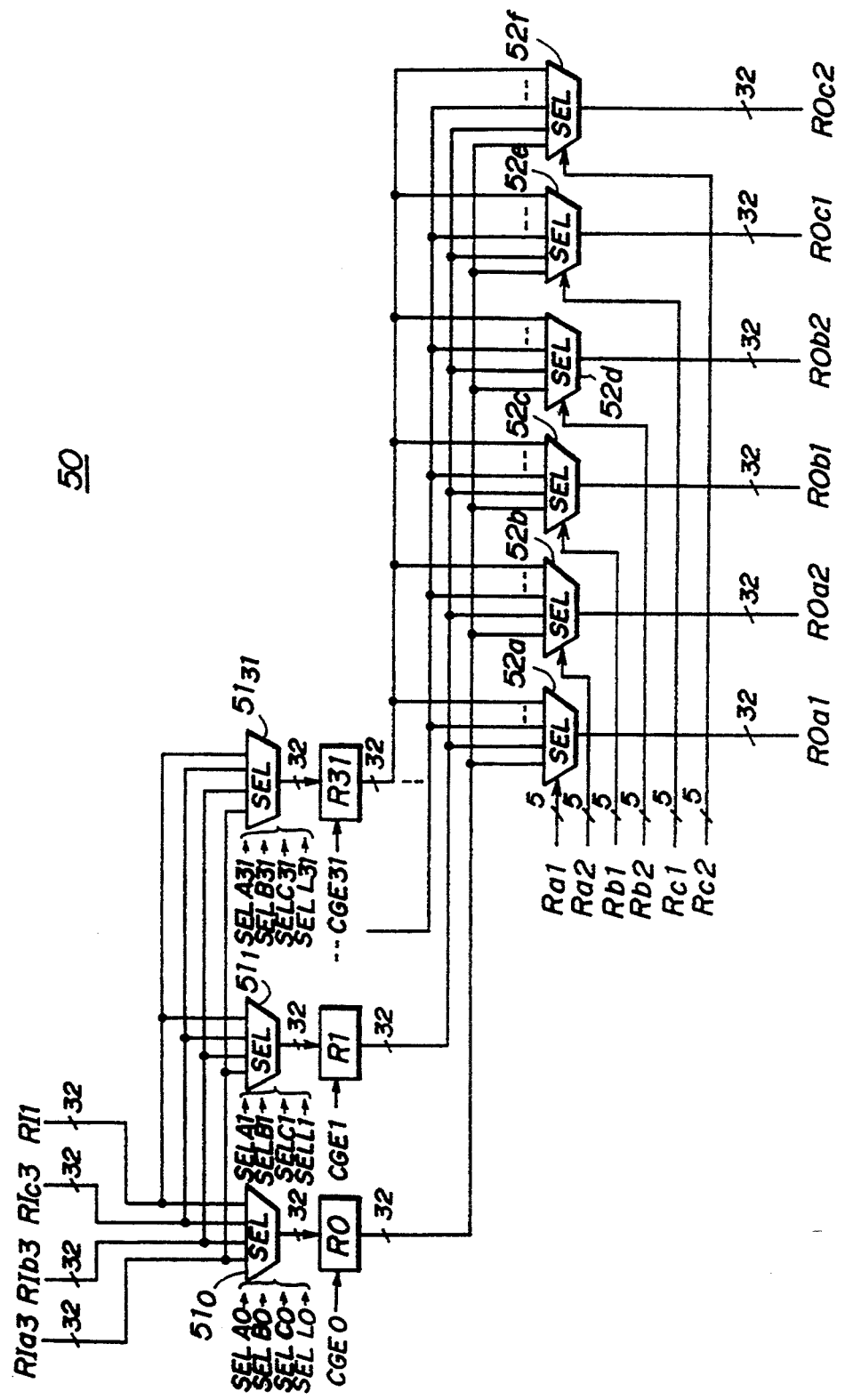
FIG. 6 is a system block diagram showing an embodiment of a register file shown in FIG. 3.

FIG. 6 shows an embodiment of a register file 50 shown in FIG. 3. In FIG. 6, 32-bit data applied to each of terminals RIa3, RIb3, RIc3 and RI1 are supplied to all selectors $51_0$ through $51_{31}$. The selectors $51_0$ through $51_{31}$ are all controlled by the outputs of the decoders 40, 41, 42 and 44 shown in FIG. 4, and select one of the 32-bit data received from the terminals RIa3, RIb3, RIc3 and RI1. Outputs of the selectors $51_0$ through $51_{31}$ are respectively supplied to registers R0 through R31. The registers R0 through R31 respectively latch the incoming data when the respective clock gate enable signals CGE0 through CGE31 are received from the OR circuits $45_0$ through $45_{31}$.

Outputs of the registers R0 through R31 are supplied to all six selectors 52a through 52f. The selector 52a is controlled by the bit numbers "9" through "13" of the instruction word which is stored in the instruction register 22, that is, by the first register specifying field Ra1. The selector 52b is controlled by the bit numbers "14" through "18" of the instruction word which is stored in the instruction register 22, that is, by the second register specifying field Ra2. The selector 52c is controlled by the bit numbers "29" through "33" of the instruction word which is stored in the instruction register 22, that is, by the first register specifying field Rb1. The selector 52d is controlled by the bit numbers "34" through "38" of the instruction word which is stored in the instruction register 22, that is, by the second register specifying field Rb2. The selector 52e is controlled by the bit numbers "49" through "53" of the instruction word which is stored in the instruction register 22, that is, by the first register specifying field Rc1. The selector 52f is controlled by the bit numbers "54" through "58" of the instruction word which is stored in the instruction register 22, that is, by the second register specifying field Rc2. The data in the registers R0 through R31 are output from terminals R0a1, R0a2, R0b1, R0b2, R0c1 and R0c2 via the respective selectors 52a through 52f which are selected by the bits of the instruction word stored in the instruction register 22.

Returning now to the description of FIG. 3, the data received from the terminal R0a1 of the register file 50 is latched in a latch circuit 55a. On the other hand, one of the data received from the terminal R0a2 of the register file 50 and the immediate data IMM32 which corresponds to the bit numbers "9" through "40" of the instruction word which is stored in the instruction register 22 is selected by a selector 54 and latched in a latch circuit 55b. The data which are latched in the latch circuits 55a and 55b are subjected to an operation in a first operation circuit 56. A result of the operation in the first operation circuit 56 is latched in a latch circuit 57.

The data received from the terminal R0b1 of the register file 50 is latched in a latch circuit 59a. On the other hand, one of the data received from the terminal R0b2 of the register file 50, the immediate data IMM25 which corresponds to the bit numbers "34" through "58" of the instruction word which is stored in the instruction register 22 and the immediate data IMM32 which corresponds to the bit numbers "27" through "58" of the instruction word which is stored in the instruction register 22 is selected by a selector 58 and latched in a latch circuit 59b. The data which are latched in the latch circuits 59a and 59b are subjected to an operation in a second operation circuit 60. A result of the operation in the second operation circuit 60 is latched in a latch circuit 61.

The data received from the terminals R0c1 and R0c2 of the register file 50 are respectively latched in latch circuits 62a and 62b. The data which are latched in the latch circuits 62a and 62b are subjected to an operation in a third operation circuit 63. A result of the operation in the third operation circuit 63 is latched in a latch circuit 64.

When executing the long instruction word having the first format, the stored data of the registers R0 through R31 which are specified by the register specifying fields Ra1, Ra2, Rb1, Rb2, Rc1 and Rc2 are output from the terminals R0a1, R0a2, R0b1, R0b2, R0c1 and R0c2 of the register file 50. In addition, by the selection of the output data from the terminal R0b2 by the selector 58, the data described above are latched in the latch circuits 55a, 55b, 59a, 59b, 62a and 62b, and operations are simultaneously carried out in the operation circuits 56, 60 and 63. The results of the operations are respectively applied to the terminals RIa3, RIb3 and RIc3 of the register file 50.

When executing the long instruction word having the second format, the stored data of the registers R0 through R31 which are specified by the register specifying fields Ra1, Ra2 and Rb1 are output from the terminals R0a1, R0a2, R0b1 and R0b2 of the register file 50. In addition, by the selection of the immediate data IMM25 by the selector 58, the data described above are latched in the latch circuits 55a, 55b, 59a and 59b, and operations are simultaneously carried out in the operation circuits 56 and 60. The results of the operations are respectively applied to the terminals RIa3 and RIb3 of the register file 50. However, when the instruction word which has the format B is a load instruction, the result of the address calculation carried out in the operation circuit 60 is supplied to the operand memory 70, and the load data is supplied from the operand memory 70 to the terminal RI1 of the register file 50.

When executing the long instruction word having the third format, the stored data of the registers R0 through R31 which are specified by the register specifying fields Ra1, Ra2 and Rb3 are output from the terminals R0a1, R0a2, R0b1 and R0b2 of the register file 50. In addition, by the selection of the immediate data IMM32 by the selector 58, the data described above are latched in the latch circuits 55a, 55b, 59a and 59b, and operations are simultaneously carried out in the operation circuits 56 and 60. The results of the operations are respectively applied to the terminals RIa3 and RIb3 of the register file 50. However, when the instruction word which has the format B is a load instruction, the result of the address calculation carried out in the operation circuit 60 is supplied to the operand memory 70, and the load data is supplied from the operand memory 70 to the terminal RI1 of the register file 50.

When executing the long instruction word having the fourth format, the stored data of the registers R0 through R31 which are specified by the register specifying field Ra1 is output from the terminal R0a1 of the register file 50. In addition, by the selection of the immediate data IMM32 by the selector 54, the data described above are latched in the latch circuits 55a and 55b, and an operation is carried out in the operation circuit 56. The result of the operation is applied to the terminal RIa3 of the register file 50. However, when the instruction word which has the format B is a load instruction, the result of the address calculation carried out in the operation circuit 60 is supplied to the operand memory 70, and the load data is supplied from the operand memory 70 to the terminal RI1 of the register file 50. In this embodiment, the processor 21 has a 32-bit structure. For this reason, the bit numbers "41" through "58" of the long instruction word having the third format are unused. But when the processor 21 has a 64-bit structure, all of the bit numbers "9" through "58" of the long instruction word having the third format can be used as an immediate data IMM51.

An instruction address output from a program counter 71 or a branch address output from the latch circuit 61 is selected by a selector 72 and is supplied to the instruction memory 20, so as to read the next long instruction word.

Figure 7:
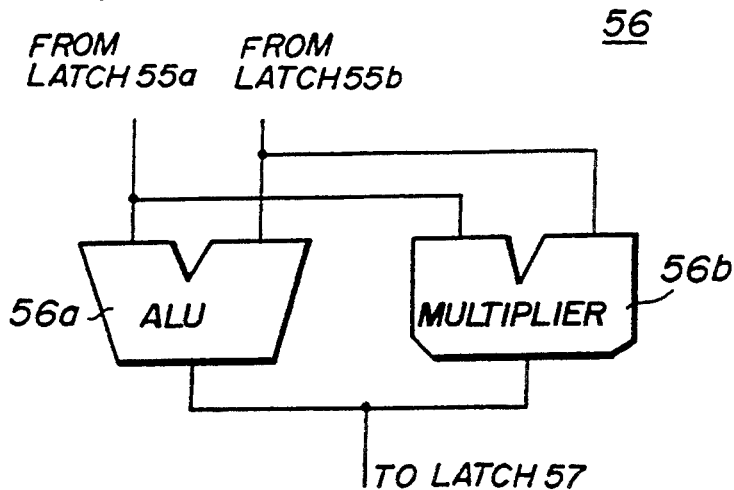
FIGS. 7, 8 and 9 are block diagrams respectively showing embodiments of operation circuits shown in FIG. 3.

FIG. 7 shows an embodiment of the operation circuit 56 shown in FIG. 3. The operation circuit 56 includes an arithmetic logic unit (ALU) 56a and a multiplier 56b which are connected as shown.

Figure 8:
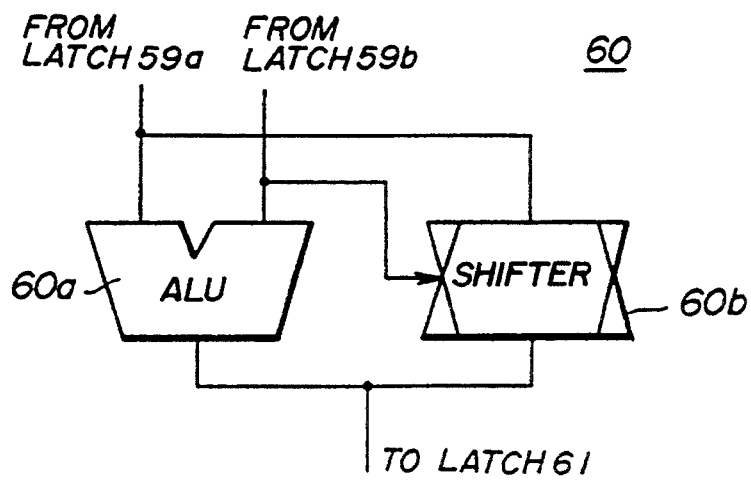

FIG. 8 shows an embodiment of the operation circuit 60 shown in FIG. 3. The operation circuit 60 includes an ALU 60a and a shift circuit 60b which are connected as shown.

Figure 9:
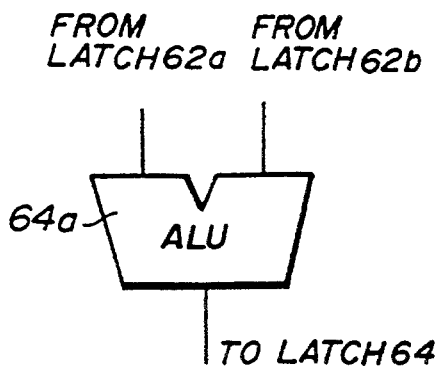

FIG. 9 shows an embodiment of the operation circuit 64 shown in FIG. 3. The operation circuit 64 includes an ALU 64a.

By restricting the instruction codes OPa, OPb and OPc of the long instruction words having the first through fourth formats to only those instructions which can be carried out in the operation circuits 57, 61 and 64, it becomes possible to facilitate the parallel execution of instructions.

Therefore, according to the present invention, the unused bits of the long instruction word are eliminated and the bit utilization efficiency is improved by forming the long instruction word which has the fixed length from the type code and one or more instruction words. In addition, it becomes possible to specify a large immediate data by reducing the number of instruction words included in the long instruction word. Furthermore, since the structure of the instruction words forming the long instruction word, that is, the combination of the instruction words forming the long instruction word, is defined by the type code, it becomes possible to simplify both the control of hardware and hardware structure when executing a plurality of instructions in parallel depending on the combination of the instruction words.

Further, the present invention is not limited to these embodiments, but various variations and modifications may be made without departing from the scope of the present invention.

What is claimed is:

1. An execution system for executing instructions in an information processing apparatus, comprising:

a plurality of operand registers;

input means for inputting a long instruction word which has a fixed length and includes a type code including a field designation and at least one instruction word of variable length the position of which is indicated by the field designation, each variable length instruction word including at least an instruction code and an operand specifying part for specifying a single instruction, the type code specifying a structure of the at least one instruction word, said variable length instruction word having a format selected from one of a first format in which the instruction code instructs an operation between contents of first and second registers and a storage of an operation result of the operation in a third register, a second format in which the instruction code instructs an operation between the content of the first register and an immediate data and a storage of an operation result of the operation in the third register, and a third format in which the instruction code instructs a storage of an immediate data in to the third register;

judging means coupled to said operand registers for judging from the type code a combination and a number of instruction words and for providing a judgement result, said judging means having means for specifying one of said operand registers depending on the operand specifying part of each variable length instruction word;

a plurality of operation means each for independently executing operations specified by different ones of the instruction words within the long instruction word; and assigning means for assigning one of the operations to one of said operation means depending on the judgement result.

2. The execution system as claimed in claim 1, wherein said operation means includes means for simultaneously executing the operations in parallel when the long instruction word includes a plurality of the variable length instruction words.

3. The execution system as claimed in claim 1, wherein said operation means includes means for simultaneously executing the operations in parallel when the fixed length long instruction word includes a plurality of the variable length instruction words.

4. The execution system as claimed in claim 1, wherein the fixed length long instruction words include:

a first long instruction word having a first word format, a second long instruction word having a second word format, a third long instruction word having a third word format, and a fourth long instruction word having a fourth word format, the first long instruction word includes the type code for differentiating different types of long instruction words and three of the first instruction words, the second long instruction word includes the type code, the first instruction word and the second instruction word, the third long instruction word includes the type code, the first instruction word and the third instruction word, and the fourth long instruction word includes the type code and the third instruction word.

5. The execution system as claimed in claim 4, wherein the type code includes four bits, the first instruction word includes twenty bits, the second instruction word includes forty bits, the third instruction word includes one of forty and sixty bits, and the fixed length of each of the long instruction words includes sixty-four bits.

6. An instructing method for specifying in a computer an instruction which is to be executed in the computer, comprising:

(a) forming, by the computer, at least one variable length instruction word comprising at least an instruction code and an operand specifying part for specifying a single operation, said variable length instruction word having a format selected from one of a first format in which the instruction code instructs an operation between contents of first and second registers and a storage of an operation result of the operation in a third register, a second format in which the instruction code instructs an operation between the content of the first register and an immediate data and a storage of an operation result of the operation in the third register, and a third format in which the instruction code instructs a storage of an immediate data in to the third register;

(b) forming, by the computer, a long instruction word, having a fixed length, from a type code and the at least one variable length instruction word, the type code specifying the at least one variable length instruction word included in the long instruction word;

(c) specifying plural operations by the long instruction word (d) assigning each of the variable length instruction words a corresponding one of plural execution units responsive to the type code; and (e) executing the variable length instructions independently in the assigned execution units.

7. A method as claimed in claim 6, wherein the fixed length instruction words including:

a first long instruction word having a first word format, a second long instruction word having a second word format, a third long instruction word having a third word format, and a fourth long instruction word having a fourth word format, the first long instruction word including the type code for differentiating different types of long instruction words and three of the first instruction words, the second long instruction word including the type code, the first instruction word and the second instruction word, the third long instruction word including the type code, the first instruction word and the third instruction word, and the fourth long instruction word including the type code and the third instruction word.

8. A method as claimed in claim 7, wherein the type code includes four bits, the first instruction word includes twenty bits, the second instruction word includes forty bits, the third instruction word includes one of forty and sixty bits, and the fixed length of each of the long instruction words includes sixty-four bits.

* * * * *

UNITED STATES PATENT AND TRADEMARK OFFICE
CERTIFICATE OF CORRECTION

PATENT NO. : 5,442,762
DATED : August 15, 1995
INVENTOR(S) : Kato et al.

It is certified that error appears in the above-indentified patent and that said Letters Patent is hereby corrected as shown below:

Cover Page, In the Abstract, line 10, delete "a".

Column 6, line 63, "$4_{50}$" should be --45°--.

Signed and Sealed this

Twenty-third Day of July, 1996

*Attest:*

BRUCE LEHMAN

*Attesting Officer*    *Commissioner of Patents and Trademarks*